(12) United States Patent
Dalmasso et al.

(10) Patent No.: US 9,728,191 B2
(45) Date of Patent: Aug. 8, 2017

(54) SPEAKER VERIFICATION METHODS AND APPARATUS

(71) Applicant: Nuance Communications, Inc., Burlington, MA (US)

(72) Inventors: Emanuele Dalmasso, Moncalieri (IT); Daniele Colibro, Alessandria (IT); Claudio Vair, Turin (IT); Kevin R. Farrell, Medford, MA (US)

(73) Assignee: Nuance Communications, Inc., Burlington, MA (US)

( * ) Notice: Subject to any disclaimer, the term of this patent is extended or adjusted under 35 U.S.C. 154(b) by 158 days.

(21) Appl. No.: 14/838,010

(22) Filed: Aug. 27, 2015

(65) Prior Publication Data
US 2017/0061968 A1 Mar. 2, 2017

(51) Int. Cl.
*G10L 15/00* (2013.01)
*G10L 17/08* (2013.01)
(52) U.S. Cl.
CPC .................... *G10L 17/08* (2013.01)
(58) Field of Classification Search
None
See application file for complete search history.

(56) References Cited

U.S. PATENT DOCUMENTS

| | | | | |
|---|---|---|---|---|
| 7,222,072 B2 * | 5/2007 | Chang | ..................... | G10L 17/22 704/249 |
| 7,240,007 B2 * | 7/2007 | Junqua | ..................... | G10L 15/24 704/246 |
| 2004/0162726 A1 * | 8/2004 | Chang | ..................... | G10L 17/22 704/247 |
| 2014/0142944 A1 * | 5/2014 | Ziv | ......................... | G10L 17/02 704/250 |
| 2014/0222678 A1 * | 8/2014 | Sheets | .............. | G06Q 20/40145 705/44 |
| 2014/0348308 A1 * | 11/2014 | Krause | ..................... | G10L 17/00 379/88.02 |
| 2015/0025887 A1 * | 1/2015 | Sidi | ......................... | G10L 17/02 704/245 |
| 2017/0017640 A1 * | 1/2017 | Bellamy | ............. | H04L 65/1066 |

OTHER PUBLICATIONS

U.S. Appl. No. 13/900,163, filed May 22, 2013, Nir Moshe Krause.

* cited by examiner

*Primary Examiner* — Marcus T Riley
(74) *Attorney, Agent, or Firm* — Wolf, Greenfield & Sacks, P.C.

(57) ABSTRACT

Techniques for automatically identifying a speaker in a conversation as a known person based on processing of audio of the speaker's voice to extract characteristics of that voice and on an automated comparison of those characteristics to known characteristics of the known person's voice. A speaker segmentation process may be performed on audio of the conversation to produce, for each speaker in the conversation, a segment that includes the audio of that speaker. Audio of each of the segments may then be processed to extract characteristics of that speaker's voice. The characteristics derived from each segment (and thus for multiple speakers) may then be compared to characteristics of the known person's voice to determine whether the speaker for that segment is the known person. For each segment, a degree of match between the voice characteristics of the speaker and the voice characteristics of the known person may be calculated.

20 Claims, 5 Drawing Sheets

SPEAKER VERIFICATION METHODS AND APPARATUS

BACKGROUND

Verifying the identity of a speaker in a communication may be useful in a variety of different contexts to protect against fraudulent or unauthorized access to information and/or secure areas. As one specific example, banks and other financial institutions receive numerous telephone calls from customers requesting assistance, inquiring about account information and/or asking to conduct a transaction. Prior to providing and/or allowing access to confidential information, or performing any transaction on behalf of a customer, the bank may need to confirm that the caller is in fact the customer whose identity is being asserted.

Conventional techniques for verifying the identify of a speaker typically involve asking one or more challenge questions to the speaker that are unlikely to be answered correctly by an imposter. For example, one or a combination of birth date, current address, social security number, mother's maiden name, etc., may be posed as challenge questions to verify that a speaker is the person whose identity is being asserted. If the speaker can satisfactorily answer one or more challenge questions, the speaker is deemed to be the person alleged.

Another technique for verifying the identity of a speaker involves using characteristics of the speaker's voice. For example, speech obtained from a person whose identity has been verified or is otherwise known may be analyzed to extract characteristics of the person's voice. The extracted characteristics may be stored as a "voice print" that generally distinguishes the person from the speech of others. A "voice print" refers herein to any type of model or collection of data that captures one or more identifying characteristics of a person's voice. Typically, a voice print is obtained during a process referred to as enrollment wherein a user is prompted to utter a particular enrollment utterance, which is then analyzed to extract characteristics of the speaker's voice. However, a voice print may also be obtained using incidental speech obtained from a user, for example, speech obtained from a user during a dialog with an agent after the identity of the user has been verified using another technique (e.g., challenge questions, password, etc.).

An enterprise, such as a financial institution, health care provider, etc., may store voice prints of its customers to facilitate the prevention of impostors gaining access to confidential information and/or performing unauthorized transactions. In particular, when a speaker asserts the identity of a particular person, the voiceprint of that person may be accessed and compared to characteristics of the speech of the present speaker. When there is a match, the speaker is presumed to be the person alleged. Otherwise, the speaker may be subjected to further inquiry, such as one or more challenge questions, or may be denied authorization outright.

SUMMARY

In one embodiment, there is provided a method of evaluating whether a first speaker in a conversation is a user whose identity has been asserted by analyzing audio of the conversation. The conversation involves a second speaker whose identity is known. At least a portion of the audio of the conversation has been decomposed into a first segment and a second segment. Each of the first segment and the second segment is composed substantially of audio of a single speaker speaking in the conversation. The method comprises comparing the first segment to a first voiceprint of the user to determine a first likelihood that the first segment corresponds to the user, comparing the first segment to a second voiceprint of the second speaker to determine a second likelihood that the first segment corresponds to the second speaker, comparing the second segment to the first voiceprint of the user to determine a third likelihood that the second segment corresponds to the user, comparing the second segment to the second voiceprint of the second speaker to determine a fourth likelihood that the second segment corresponds to the second speaker, and determining whether the first speaker is the user based, at least in part, on the first, second, third and fourth likelihoods.

In another embodiment, there is provided at least one non-transitory computer-readable storage medium having encoded thereon executable instructions that, when executed by at least one processor, cause the at least one processor to carry out a method for determining whether a first known person is speaking in a conversation involving two or more speakers. One of the two or more speakers is known to be a second known person. The method comprises comparing each segment of two or more segments of audio of the conversation to at least two voiceprints, wherein the at least two voiceprints comprise a first voiceprint for the first known person and a second voiceprint for the second known person. The two or more segments of the audio comprise a first segment of audio for a first speaker in the conversation and a second segment of audio for a second speaker in the conversation. The first segment of audio for the first speaker comprises audio of the conversation that has been identified as corresponding to the first speaker speaking in the conversation and the second segment of audio for the second speaker comprises audio of the conversation that has been identified as corresponding to the second speaker speaking in the conversation. The method further comprises determining, based at least in part on a result of the comparing, whether any one of the two or more speakers is the first known person.

In a further embodiment, there is provided an apparatus comprising at least one processor and at least one storage medium having encoded thereon executable instructions that, when executed by the at least one processor, cause the at least one processor to carry out a method of evaluating whether a first speaker in a conversation is a user whose identity has been asserted by analyzing audio of the conversation. The conversation involves a second speaker whose identity is known. At least a portion of the audio of the conversation has been decomposed into a first segment and a second segment. Each of the first segment and the second segment is composed substantially of audio of a single speaker speaking in the conversation. The method comprises comparing the first segment to a first voiceprint of the user to determine a first likelihood that the first segment corresponds to the first speaker, comparing the first segment to a second voiceprint of the second speaker to determine a second likelihood that the first segment corresponds to the second speaker, comparing the second segment to the first voiceprint of the user to determine a third likelihood that the second segment corresponds to the first speaker, comparing the second segment to the second voiceprint of the second speaker to determine a fourth likelihood that the second segment corresponds to the second speaker, and determining whether the first speaker is the user based, at least in part, on the first, second, third and fourth likelihoods.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
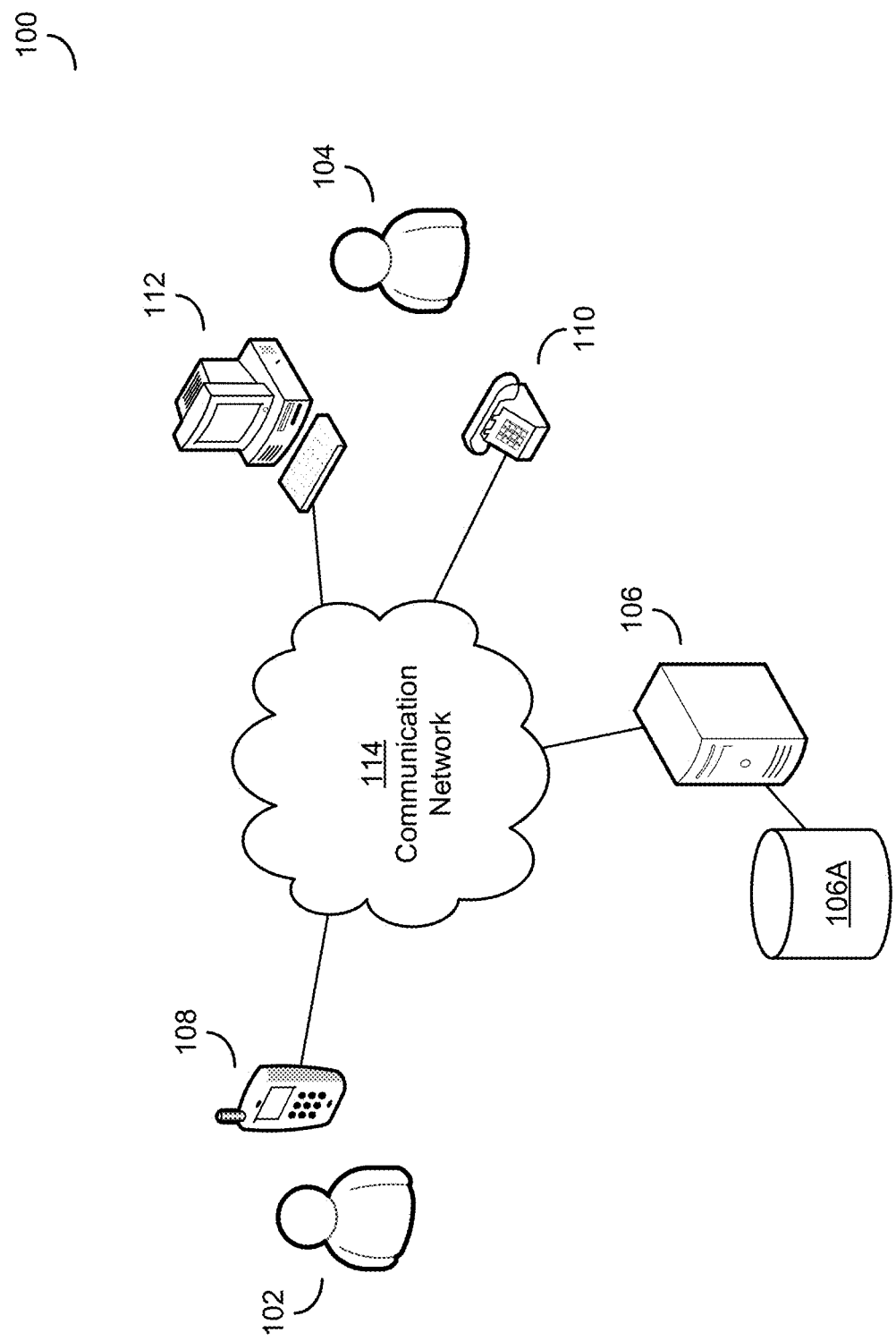
FIG. 1 is an illustration of an example of a computer system with which some embodiments may operate.

As discussed above, some systems have attempted to address the problem of speaker verification by comparing voice characteristics of a speaker with a voice print of the person whose identity the speaker is asserting. However, this technique has a number of drawbacks. In addition to often being unreliable (e.g., unsatisfactorily high false negative and/or false positive rates), a straightforward comparison of the speaker's voice characteristics with a voice print is not possible in a wide range of circumstances that could otherwise benefit from such automated speaker verification techniques. For example, in many situations where a caller is speaking to a representative or agent of an organization (e.g., a financial institution, a hospital or doctor's office, customer service, etc.), the call recording technology may not record the caller and the agent separately. Instead, audio of the conversation is recorded on a single channel and, as a result, includes speech from both the caller and the agent. The presence of the agent's speech in the audio recording prevents the conventional technique of comparing characteristics of the audio to a voice print from being used satisfactorily.

To address this issue, automatic segmentation techniques have been utilized that segment multi-party single channel audio (i.e., audio that comprises speech from multiple speakers) into separate audio segments corresponding to speech from the respective speakers participating in a communication. For example, in a call between a caller and an agent recorded over a single channel, automatic segmentation techniques endeavor to separate audio corresponding to speech from the caller and audio corresponding to speech from the agent to provide a first audio segment composed substantially of speech from the caller and a second audio segment composed substantially of speech from the agent.

In this context, an "audio segment" refers to audio that has been identified as being composed substantially of speech from a single speaker. An audio segment may result from concatenating audio portions identified as corresponding to speech from the same speaker, or alternatively, audio portions identified as corresponding to speech from the same speaker may be labeled as such rather than concatenating the individual audio portions. For calls with more than two speakers participating, automatic segmentation techniques attempt to provide an audio segment for each speaker that is composed substantially of speech from the respective speaker. However, while segmentation techniques are able to identify speech from different speakers with generally sufficient accuracy, automatic segmentation techniques are not able to identify which resulting audio segment belongs to which speaker.

To then perform speaker verification, some conventional techniques compare a voiceprint of a person whose identity is being asserted by a speaker with characteristics extracted from each audio segment produced via automatic segmentation and, if there is a match with one of the audio segments (e.g., a similarity score is greater than a predetermined threshold value), the speaker is deemed to be the person alleged. However, this technique suffers from a number of drawbacks. For example, segmentation is frequently imperfect, resulting in some portions of audio corresponding to speech from one speaker being mistakenly classified as speech from another speaker. These incorrectly classified audio portions cause difficulty in speaker verification when characteristics are subsequently derived from the audio segments, because a given audio segment will include speech from multiple speakers.

Thus, the characteristics extracted from the audio segment may less accurately represent the voice of the corresponding speaker as a result of the corrupting influence of audio from one or more different speakers, potentially resulting in a negative result despite the fact that the speaker is indeed the person alleged. Such false negatives can unnecessarily raise suspicion and the caller may be subjected to a series of challenge questions, an extended dialogue while further audio is recorded so that a more accurate comparison can be made, or outright denial of access, any of which are inconvenient, time consuming and/or off-putting for the customer.

In addition, employing customer voice prints alone to identify which audio segment belongs to the agent and which to the caller and/or to verify the identity of the caller may still be too unreliable and/or may result in substantial uncertainty (e.g., when scores for both, or all, audio segments are relatively low). The inventors have recognized that using agent voice prints can substantially improve the reliability of identifying which audio segment corresponds to speech from the agent. Because relatively large amounts of agent speech data may be available to the system, a robust agent voice print can be obtained and often used to reliably ascertain whether an audio segment obtained via automatic segmentation corresponds to speech from the agent. Thus, in a two person communication between an agent and a caller, once an audio segment is identified as corresponding to speech from the agent via the agent voice print, the other audio segment can be attributed to the caller and characteristics extracted therefrom can be compared to a voice print of the person whose identity is being asserted. This technique, referred to as "agent filtering," is described in U.S. application Ser. No. 13/900,163, titled "Method and System for Speaker Verification" and filed on May 22, 2013.

The inventors have recognized that the reliability of speaker verification can be further improved over conventional techniques by comparing an agent voice print and one or more user voice prints to each audio segment produced via automatic segmentation. The results of these comparisons may be used to verify the identity of one or more speakers with a higher degree of accuracy than achieved using conventional techniques. For example, by comparing an agent voice print and one or more user voice prints to each audio segment produced via segmentation, improved accuracy may be achieved over techniques that utilize an agent voice print to designate audio segments as corresponding to speech of the agent and one or more respective speakers (e.g., via agent filtering techniques), followed by a comparison of a user voice print to the audio segment designated as corresponding to the speaker that is asserting the user's identity. In addition, techniques described herein may be more robust to errors in automatic segmentation.

Following below are more detailed descriptions of various concepts related to, and embodiments of, methods and apparatus for speaker verification. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 illustrates an example of an environment in which some embodiments may operate. As illustrated in FIG. 1, the computer system 100 includes a first person 102 and a second person 104, speaking in a conversation. The conversation may be any suitable conversation between two (or more) speakers and the speakers may be any suitable parties, as embodiments are not limited in this respect. In some embodiments, the conversation may be a phone call between the two persons 102, 104. The first person 102 may be a caller who has called an organization associated with the second person 104, and the second person 104 may be acting in the conversation on behalf of the organization, as the organization's agent. As one specific example, the organization may be a bank or other business and the second person 104 may be a customer service agent of the business.

For ease of description below, the first and second persons 102, 104 and the conversation will be described in connection with this example as the "caller" and the "agent", though it should be appreciated that embodiments are not limited to operating in accordance with this example nor limited to operating in a phone call context. As used herein, the term "agent" refers to a speaker in a communication whose identity is known to the verification system, and the term "caller" refers to a speaker in a communication whose identity is being verified. A known person refers to a person whose identity is known to the system for which verification is being performed and is typically an authorized user of the system or service to which access is desired (e.g., a customer of a financial institution, a patient of a health care provider, an employee of an organization, etc.). Thus, identifying a speaker as a known person refers to verifying that the speaker is the known person whose identity is being asserted by the speaker.

In the call, the caller 102 may assert that he or she is a person who is known to the organization, such as a customer of the organization. In accordance with techniques described herein, a speaker identification facility, executing on one or more computing devices 106, may analyze audio of the conversation between the caller 102 and the agent 104 to determine whether the caller 102 is the known person, such as by determining whether the known person is speaking in the conversation.

The organization may have previously obtained information on characteristics of a voice of the known person, such as by collecting audio from the known person at a previous time and extracting the characteristics from that audio. The organization may additionally have obtained information on characteristics of a voice of the agent 104, such as by collecting audio from the agent 104 at a previous time and extracting the characteristics from that audio. Characteristics for the known person and for the agent 104 may be stored in a data store 106A to which the computing device(s) 106 has access. The information on the vocal characteristics of the known person and the agent may be used in identifying whether the caller 102 is the known person.

Any suitable characteristics that describe audio of a person speaking may be used in accordance with techniques herein, including vocal characteristics that have been used in connection with conventional speaker identification techniques, as embodiments are not limited in this respect. For ease of description below, information regarding characteristics of a voice of a person will be referred to as a "voiceprint" for the person.

FIG. 1 illustrates devices that may be operated by the caller 102 and the agent 104 during the conversation. The caller 102 and agent 104 may, for example, operate devices to transmit audio data for a telephone call, such as smart phone 108 and telephone 110. It should be appreciated, however, that embodiments are not limited to operating with devices that transmit only audio data for a conversation, nor limited to operating with telephones. In other embodiments, one or both of the caller 102 and the agent 104 may operate a videophone, or a computing device (e.g., personal computer, smart phone, tablet computer, etc.) with a camera, and may transmit a combination of video and audio for the conversation. In other embodiments, one or both of the caller 102 and agent 104 may operate a device that is capable of transmitting video for a conversation, but may only transmit audio for the conversation and not video. Embodiments are not limited in this respect.

During the conversation, the agent 104 may also operate a computer system, which is illustrated in FIG. 1 as a personal computer 112 but may be any suitable computing device. Though illustrated in FIG. 1 as separate from device 110, it should be appreciated that in some embodiments device 110 and device 112 may be the same device that is configured to perform the functionality described herein of both device 110 and device 112.

The device 112 may be configured with, for example, software to assist the agent 104 in providing services on behalf of the business (or other organization) to the caller 102, such as by enabling the agent 104 to access information on an account of the known person that the caller 102 claims to be. In some embodiments, as discussed in detail below, the device 112 may prompt the agent 104 with information to provide to the caller 102 during the conversation, including questions to ask the caller 102 during the conversation. For example, during an identification process for the caller 102, the speaker identification facility executing on the device 106 may prompt the agent 104 to provide information to the caller 102 or ask questions of the caller 102, to obtain audio from the caller 102 for use by the speaker identification facility.

In some embodiments, the speaker identification facility may prompt the agent 104 via the device 112 to ask challenge questions of the caller 102, which prompt the caller 102 to provide personal information related to the known person that the caller 102 claims to be. Such challenge questions may include questions directed to personally-relevant facts for the known person. The personally-relevant facts may include facts about the known person, including facts related to family members or friends of the known person, pets of the known person, or personal hobbies or interests of the known person.

In some embodiments that use challenge questions, the answers provided by the caller 102 to the challenge questions may not be used in determining whether the caller 102 is the known person (or whether the known person is speaking in the conversation), but instead only the audio of the caller 102 speaking answers to the questions may be used. In other embodiments, however, the speaker identification facility may base a determination of whether the caller 102 is the known person (or whether the known person is speaking in the conversation) at least in part on whether the caller 102 has correctly answered some or all of the challenge questions. In embodiments that use answers to challenge questions in this way, the speaker identification facility may provide the agent 104, via the device 112, with correct answers to the challenge questions. The agent 104 may, upon receiving the answer provided by the caller 102 to a challenge question, indicate via the device 112 whether the caller 102 correctly answered a challenge question.

In some embodiments that use such challenge questions, the questions and answers for the known person may be stored in the data store 106A in association with the known person. In some embodiments in which the answers to the challenge questions are not used in determining whether the caller 102 is the known person (or whether the known person is speaking in the conversation), the answers to the challenge questions may not be stored and the questions may be generic to (rather than specifically associated with) known users for which information is stored in the data store 106A.

Each of the devices illustrated in FIG. 1 may communicate via one or more communication networks, illustrated collectively in FIG. 1 as communication network 114. Network 114 may include one or more wired and/or wireless networks. The networks may include the Plain Old Telephone Service (POTS) network, a wireless wide-area network (WWAN) such as a cellular network, one or more wide-area networks such as enterprise networks, one or more local area networks (LANs), and/or the Internet. For example, in some embodiments, the device 108 operated by the caller 102 may transmit audio data to the telephone 110 of the agent 104 via a cellular network, the POTS network, and call center equipment operated by the business. In this example, the device 106 may receive audio data from the call center equipment and/or from the POTS network and may communicate with the device 112 via an enterprise network and/or a LAN. Though, it should be appreciated that this is merely an example and that the devices may be interconnected in any other suitable manner.

Examples of ways in which a speaker identification facility may operate to evaluate audio of a conversation and determine whether a caller is a known person, or whether a known person is speaking in a conversation, are described below in connection with FIGS. 2-4.

Figure 2:
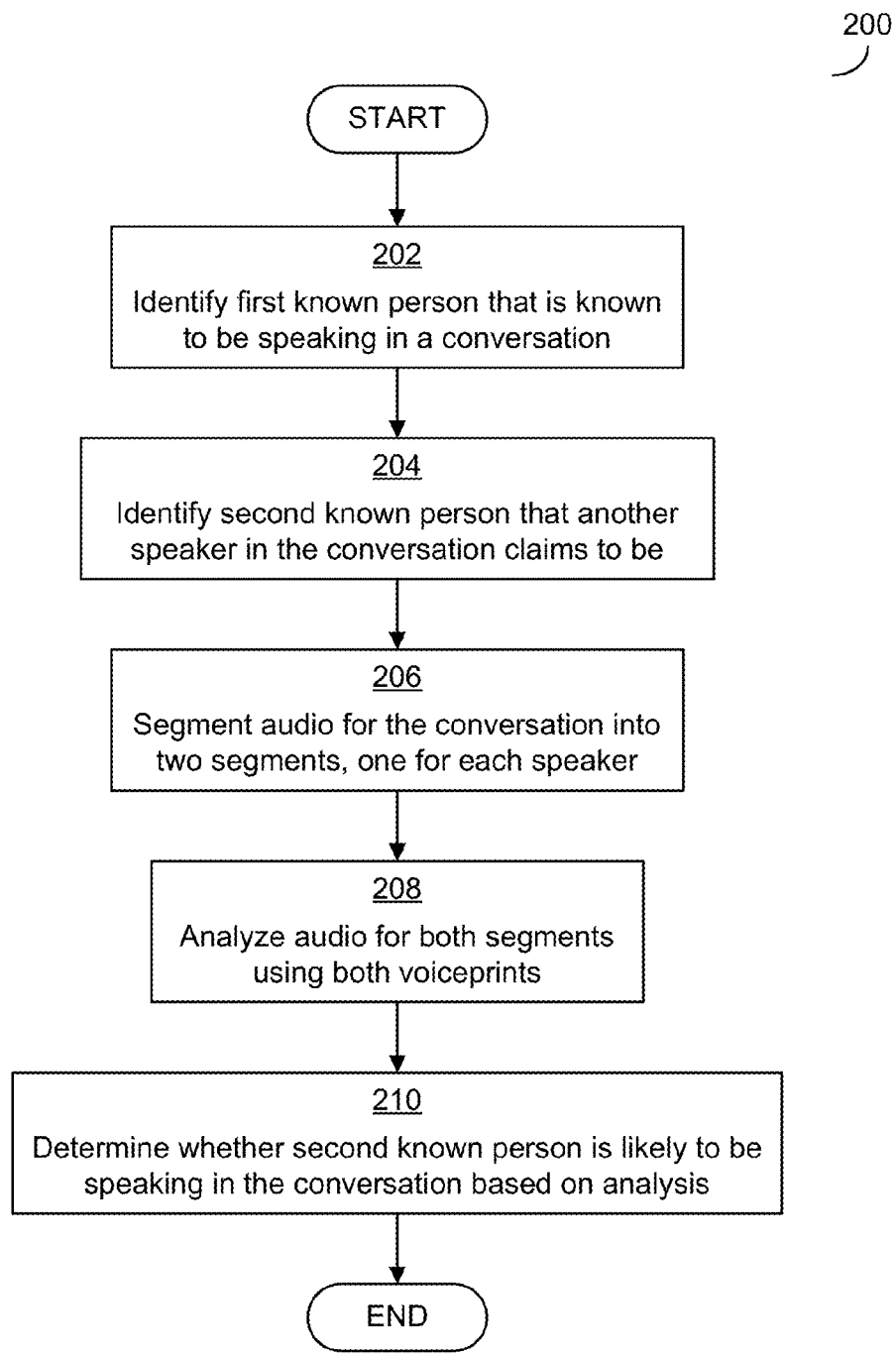
FIG. 2 is a flowchart of an example of a technique for determining whether a known person is a speaker in a conversation.

FIG. 2 illustrates an example of a process that may be implemented by a speaker identification facility in some embodiments. The process 200 may be performed during a conversation, such as at the beginning of a call between a caller and an agent such that the caller's identity may be verified before the call proceeds (e.g., before confidential information is disclosed). The conversation may be initiated (e.g., the call may be connected) prior to the start of the process 200 and the speaker identification facility may be triggered to start the process 200 by any suitable condition. For example, in some embodiments one of the speakers in the call may trigger the process via a user interface, such as an agent instructing a start of a speaker identification process by operating the device 112 discussed above in connection with FIG. 1. As another example, in some embodiments the speaker identification facility may be triggered by detecting that one or both speakers in the conversation has started to speak and the conversation has begun. As a further example, in some embodiments speaker identification facility may be triggered by the speaker identification facility or another facility detecting that a threshold amount of audio for the conversation has been collected, such as audio for 10 seconds of the conversation, for 20 second, or for 30 seconds, or any other suitable amount of audio.

The example of FIG. 2, and other examples described herein, are described in connection with a conversation between two people, for ease of description. Those skilled in the art will appreciate how to adapt the examples described herein for use with conversations including more than two speakers, where one of the speakers is claiming to be a known person.

The speaker identification facility may receive audio of the conversation in any suitable manner, as embodiments are not limited in this respect. In some embodiments, the speaker identification facility may interoperate with call center equipment, such as equipment that routes calls and audio for calls, and may receive the audio for the conversation from the call center equipment.

The process 200 begins in block 202, in which the speaker identification facility identifies a first known person that is known to be speaking in the conversation. The speaker identification facility may know the identity of one of the parties to the conversation because, for example, it is preconfigured with the information or receives the information along with any other information about the conversation (e.g., with the audio). For example, when the conversation is a call to a person or organization (e.g., a business), the speaker identification facility may be pre-configured with information regarding the person or a person who takes or is (at the time of the conversation) taking calls on behalf of the business. As another example, when the conversation is a call to a business that has a call center with a number of agents, the speaker identification facility may receive from call center equipment an identification of an agent who is on the call. Thus, the speaker identification facility has access to information stating that the "first known person" of FIG. 2 (e.g., an agent of a business) is one of the speakers in the conversation. For ease of description the "first known person" will be referred to as the "agent".

In block 204, the speaker identification facility identifies a second known person that one of the speakers in the conversation is claiming to be. In the call example discussed above, this may be a customer of a business that a caller is claiming to be. The speaker may claim to be the second known person in any suitable manner, as embodiments are not limited in this respect. For example, the speaker may explicitly identify the second known person, such as by name, an account number, or other unique identifier for the second known person. As another example, the speaker may implicitly identify the second known person, such as by initiating the conversation using equipment that is associated with the second known person, such as by calling from a phone or phone number associated with the second known person. For ease of description below, the "second known person" will be referred to as the "customer" and the speaker claiming to be the customer will be referred to as the "caller".

The speaker identification facility has access to voiceprints for the agent and the customer. As discussed above, the voiceprints for each known person characterize the voice of the known person so that the voiceprint can be used to determine whether audio of a voice is audio of the known person speaking. The speaker identification facility will use the two voiceprints for the agent and the customer to determine whether the customer is speaking in the conversation (since the agent is already known to be speaking in the conversation).

The process 200 continues in block 206, in which the speaker identification facility segments audio for the conversation segments audio for the conversation into two segments, one for each speaker. Any suitable speaker segmentation techniques, including known techniques, may be used in block 206, as embodiments are not limited in this respect. In some embodiments, the speaker identification facility may implement the known speaker segmentation techniques. In other embodiments the speaker identification facility may provide audio for the conversation to an external facility to perform the segmentation and receive in response two segments of audio, each comprising multiple clips of audio of a speaker speaking. Each segment is intended to include audio corresponding to only one of the two speakers in the conversation. Though, as should be appreciated from the foregoing, there may be some erroneously-classified clips in one or both of the segments.

In block 208, the speaker identification facility analyzes both audio segments using both voiceprints. The analysis may be carried out in any suitable manner. In some embodiments, for example, each audio segment may be analyzed to extract characteristics of the voice speaking in the segment, to produce a voiceprint for the segment. The voiceprint for a first of the segments may then be compared to the voiceprint for the first known person and the voiceprint for the second known person. In addition, the voiceprint for a second of the segments may be compared to the voiceprint for the agent and to the voiceprint for the customer. Through the comparison, the speaker identification facility may produce a degree of match between each segment and each voiceprint.

In block 210, the speaker identification facility may determine, based on the comparisons between each segment and each voiceprint, whether the customer is speaking in the conversation. For example, the speaker identification facility may produce a score indicating a match between the voiceprints and the conversation and evaluate that score, such as by comparing the score to a threshold. If the score is above a threshold, the facility may identify that the customer is speaking in the conversation. Because one of the speakers is already known to be the agent by determining that the customer is speaking in the conversation, it can be determined that the other speaker (e.g., the caller) is the customer. Since the caller has claimed to be the customer, this claim can be confirmed or disconfirmed through the process 200.

Once a result is determined in block 210, the process 200 ends. Following the process 200, the result may be used in any suitable manner, which may vary based on the purpose for which a speaker's identity is being verified. For example, the result may be conveyed to an agent, to inform the agent that a caller's identity has been confirmed or disconfirmed and to allow the agent to proceed with the call accordingly. As another example, the result may be used to provide access to a person to information or to an area, or for any other reason.

In the example of FIG. 2, the speaker identification facility received an indication that a speaker in a conversation claimed (explicitly or implicitly) to be a second known person, such as a customer. It should be appreciated that embodiments are not so limited. In some embodiments, for example, the speaker identification facility or another facility may have identified that one of the speakers is likely to be a second known person, without one of the speakers having claimed to be the second known person. For example, based on a facial recognition analysis performed on an image or video of parties to a conversation, one of the parties to a conversation may have been identified as potentially being a second known person. The speaker identification facility may, based on that possibility, determine through analysis of the audio as described above whether one of the speakers is the second known person. Embodiments are not limited to identifying in any particular manner that one of the speakers in the conversation may be the second known person.

The example of FIG. 2 describes, in connection with blocks 208 and 210, that an analysis may be performed on segments of audio from a conversation using voiceprints of two known persons, such as an agent and customer. FIG. 3 illustrates an example of a process that may be used in some embodiments for performing that analysis. For ease of description, FIG. 3 will continue to be described in the context of a call and an "agent", a "caller", and a "customer," though it should be appreciated that embodiments may be implemented in other contexts.

Figure 3:
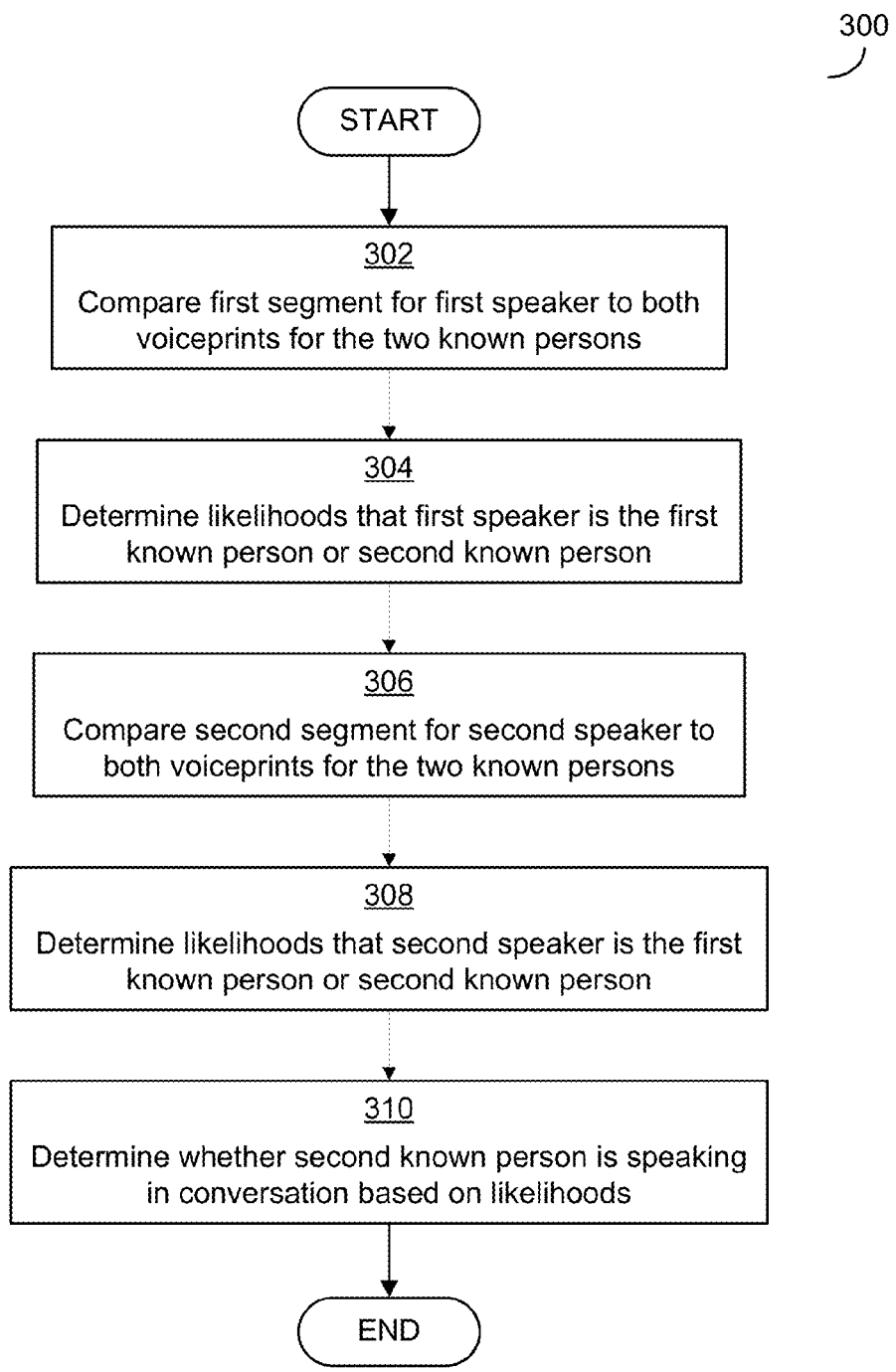
FIG. 3 is a flowchart of an example of a technique for determining whether a known person is a speaker in a conversation.
Figure 4:
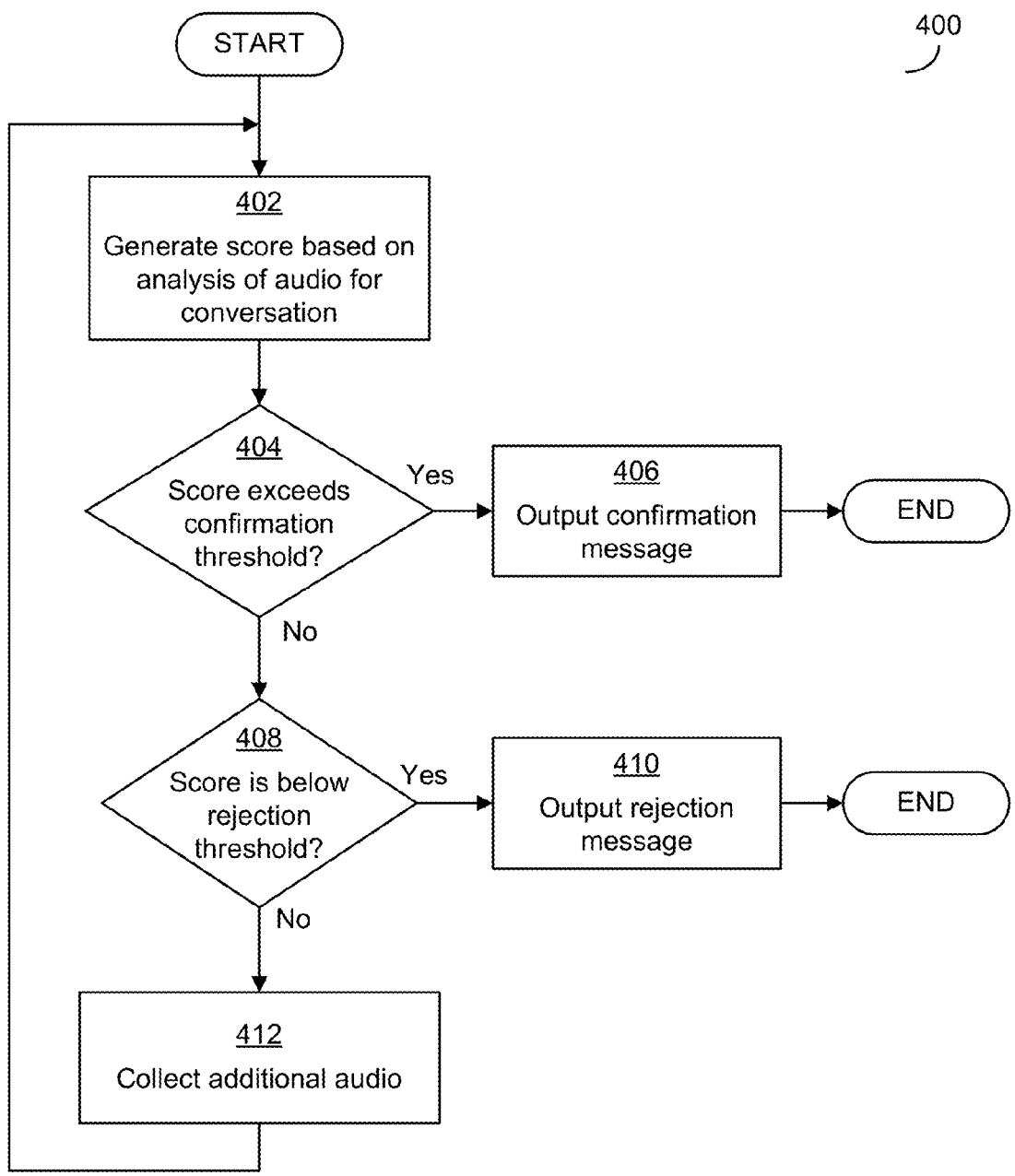
FIG. 4 is a flowchart of an example of evaluating a score indicative of whether a known person is a speaker in a conversation.

Prior to the start of the process 300 of FIG. 3, audio for a conversation may be received and segmented to produce two segments, one for each speaker of the conversation. In addition, voiceprints for two known persons are received, which correspond to a person known to be speaking in the conversation (e.g., the agent) and another person (e.g., a customer) that the speaker identification facility will, through the process 300, determine is or is not speaking in the conversation.

The process 300 of FIG. 3 begins in block 302, in which the speaker identification facility compares a first segment for a first speaker to the voiceprints for the agent and the customer. In block 302, the facility may not determine whether the segment corresponds to the caller or the agent, or to any specific party to a conversation. Rather, the facility compares the segment to the two voiceprints to determine a degree of match between the segment and each of the voiceprints. The comparison may be performed in any suitable manner. In some embodiments, the speaker identification facility may analyze a segment to extract characteristics for the segment and thereby determine a voiceprint for a segment and then compare the voiceprint for the segment to each voiceprint for the known persons. Known techniques for comparing audio to a voiceprint may also be used. Through the comparison in block 302, the facility determines a score indicating, for each voiceprint, a degree of match between the segment and the voiceprint.

In block 304, the speaker identification facility determines likelihoods that the first speaker, to whom the first segment corresponds, is either the agent or the customer who the caller claims to be. The facility may generate the likelihoods by evaluating the scores generated in block 302 using distributions of scores.

For example, the facility may have distributions of scores, such as in the form of one or more probability density functions or a cumulative density function. In some embodiments, the facility may have two distributions. One may be a distribution of scores for degrees of match between an audio of a person speaking and a voiceprint for that person, which are scores for a "correct" match between a segment and a voiceprint. The other may be a distribution of scores for degrees of match between audio of a person speaking and a voiceprint for a different person, which are scores for an "incorrect" match between a segment and a voiceprint. Using these distributions, the facility may analyze the scores from block 302 to determine a likelihood that the first speaker, whose audio was included in the first segment, is or is not the agent and a likelihood that the first speaker is or is not the customer.

For example, if the first, "correct" distribution is a Gaussian distribution with a mean of 3.0 and a standard deviation of 1.0 (i.e., the distribution N(3,1)), and a degree of match between the first segment and the voiceprint for the agent was 0.4, then the facility may calculate a likelihood that the first speaker is the agent using the probability density function PDF(0.4, N(3,1)). This yields a result of 0.0138, indicating a 0.0138 likelihood that the first speaker actually is the agent. The facility may similarly calculate a likelihood for a match between the first segment and the voiceprint for the customer. If the degree of match was 2.3, the facility would evaluate the probability density function PDF(2.3, N(3,1)), yielding a 0.3123 likelihood that the first speaker actually is the customer.

These two values were calculated using the distribution for scores for "correct" matches. It is possible, however, that an incorrect match may still yield a high or relatively high match score in some cases. In some embodiments, therefore, the facility may calculate likelihoods using the second distribution for "incorrect" matches between a speaker and a voiceprint. This might be considered a likelihood that the voiceprint is an incorrect match to the speaker. If the second, "incorrect" distribution is a Gaussian distribution with a mean of 0.0 and a standard deviation of 1.0 (i.e., the distribution N(0,1)), and a degree of match between the first segment and the voiceprint for agent was 0.4, then the facility may calculate a likelihood that the first speaker is not the agent using the probability density function PDF(0.4, N(0,1)). This yields a result of 0.3682, indicating a 0.3682 likelihood that the voiceprint for the agent may be an incorrect match to the first speaker. Similarly, if the degree of match between the first segment and the voiceprint for the customer was 2.3, the facility would evaluate the probability density function PDF(2.3, N(0,1)), yielding a 0.0283 chance that the voiceprint for the customer may be an incorrect match to the first speaker.

The likelihoods calculated in block 304 may be considered calculations of a "fit" to the distributions of the degrees of match calculated in block 302, to identify the distribution to which a degree of match most likely belongs. For example, the 0.0138 likelihood that the first speaker actually is the agent discussed above may be considered a 0.0138 likelihood that this degree of match belongs to the "correct" distribution and this reflects a degree of match between a voiceprint of a person and audio for that person. Similarly, the 0.3682 likelihood that the voiceprint for the agent is an incorrect match to the first speaker may be considered a 0.3682 likelihood that this degree of match belongs to the "incorrect" distribution and reflects a degree of match between a voiceprint of a person and audio for a different person.

Thus, in block 304, the speaker identification facility calculates four values based on the first segment of the first speaker speaking and the two voiceprints for the first and second known persons:
 a likelihood that the first speaker actually is the agent;
 a likelihood that the first speaker actually is the customer;
 a likelihood that the first voiceprint (for the agent) is an incorrect match to the first speaker; and
 a likelihood that the second voiceprint (for the customer) is an incorrect match to the first speaker.

Labeling the "first known person" the agent, the second known person the "customer," the first segment the first speaker segment "0," the "correct" distribution the "true" matches distribution, and the "incorrect" distribution the "imposter" matches distribution, these four likelihoods can be labeled, respectively:

$\text{Agent}_{true0}$ (0.0138, using the exemplary values above)
$\text{Customer}_{true0}$ (0.3123, using the exemplary values above)
$\text{Agent}_{imposter0}$ (0.3682, using the exemplary values above)
$\text{Customer}_{imposter0}$ (0.0283, using the exemplary values above)

In block 306, the speaker identification facility compares a second segment for a second speaker to the voiceprints for the two known persons, the agent and the customer. This may be performed in the same manner as described above in connection with block 302, but for the second segment that resulted from the segmentation performed on the audio of the conversation. Similarly, in block 308, the facility may calculate likelihoods that the second speaker is or is not the agent or the customer, using the same technique described in connection with block 304. Through the analysis of block 308, and using the labels discussed in the preceding paragraph and further labeling the second segment for the second speaker segment "1," the speaker identification facility may calculate another four likelihoods:

$\text{Agent}_{true1}$: a likelihood that the second speaker actually is the agent (PDF(1.5, N(3,1)=0.1295, using exemplary values for a degree of match between voiceprints and for a normal/Gaussian distribution of match values);
 $\text{Customer}_{true1}$: a likelihood that the second speaker actually is the customer (PDF(0.7, N(3,1)=0.0283, using exemplary values);
 $\text{Agent}_{imposter1}$: a likelihood that the first voiceprint (for the agent) is an incorrect match to the second speaker (PDF(1.5, N(0,1)=0.1295, using the exemplary values above); and
 $\text{Customer}_{imposter1}$: a likelihood that the second voiceprint (for the customer) is an incorrect match to the second speaker (PDF(0.7, N(0,1)=0.3123, using the exemplary values above);

These eight likelihoods calculated in blocks 304, 308 cover each of the eight permutations of possibilities for matches between the two segments, the two voiceprints, and two distributions: the first voiceprint is a correct match with the first segment; the first voiceprint is not a correct match with the first segment; the first voiceprint is a correct match with the second segment, etc. Using these eight likelihoods, the speaker identification facility determines in block 310 whether the second known person is speaking in the conversation. An example of how the facility may make this determination is described, but it should be appreciated that other techniques may be used.

First, the speaker identification facility may normalize the likelihoods for each speaker and each voiceprint, to yield four likelihoods covering each of the four permutations between two speakers and two known persons:
 the first speaker is the agent, labeled $\text{Agent}_0$ herein;
 the first speaker is the customer, labeled $\text{Customer}_0$ herein;
 the second speaker is the agent, labeled $\text{Agent}_1$ herein; and
 the second speaker is the customer, labeled $\text{Customer}_1$ herein.

The normalized probabilities may be calculated based on the eight probabilities described above. Specifically, the normalized likelihood of a match between a speaker and a known person depends on not only the likelihood described above that the segment for that speaker is a correct match to the voiceprint for that known person, but also the likelihood described above that the segment for that speaker is an incorrect match to the voiceprint for that known person. For example, to determine a normalized probability of a match between the segment for the first speaker (labeled "0"

herein) and the voiceprint for the first known person (labeled "Agent" herein), the following two likelihoods may be used:

$Agent_{true0}$: the likelihood that the first speaker actually is the agent; and $Agent_{imposter0}$: the likelihood that the agent's voiceprint is an incorrect match to the first speaker.

In a normalizing process, these values may be used in the following equation:

$$Agent_0 = Agent_{true0}/(Agent_{true0} + Agent_{imposter0}) \quad [1]$$

Using the exemplary values above, this evaluates to a likelihood of 0.0355 that the first speaker is the agent.

Similar normalized values may be calculated for each of the other combinations of speakers and known persons:

$Agent_1$: the likelihood that the second speaker is the agent:

$$Agent_1 = Agent_{true1}/(Agent_{true1} + Agent_{imposter1}) \quad [2]$$
$$0.50 \text{ (using the values from the example above)}$$

$Customer_0$: the likelihood that the first speaker is the customer $$Customer_0 = Customer_{true0}/(Customer_{true0} + Customer_{imposter0}) \quad [3]$$
$$= 0.9168 \text{ (using the values from the example above)}$$

$Customer_1$: the likelihood that the second speaker is the customer $$Customer_1 = Customer_{true1}/(Customer_{true1} + Customer_{imposter1}) \quad [4]$$
$$= 0.0832 \text{ (using the values from the example above)}$$

As should be appreciated from the foregoing, the speaker identification facility is performing this analysis and these computations to determine whether the customer is speaking in the conversation. The customer may be either the first speaker (for the first segment from the segmentation) or the second speaker (for the second segment from the segmentation), but the facility may determine merely whether the second known person is either of the two speakers speaking in the conversation.

Accordingly, the speaker identification facility may further identify a likelihood that the first speaker is the customer, and a likelihood that the second speaker is the customer. These likelihoods may be based on the four normalized likelihoods described immediately above. Specifically, the facility may calculate the likelihood that the first speaker is the customer based not only on the normalized likelihood that the first speaker is the customer but also on the normalized likelihood that the second speaker is the agent. This is because, when there are two speakers in a conversation, if one speaker is to be positively identified as one known person, the other speaker must then be the other known person. Increased accuracy in identification may be achieved by accounting for this in the calculation. Accordingly, the likelihood that the second known person ("Customer", in the example) is the first speaker ("0" in the example) is calculated based on the likelihood that the first speaker is the customer, $Customer_0$, and the likelihood that the second speaker is the agent, $Agent_1$ in the equation [5]:

$$Customer_{score0} = Customer_0 * Agent_1 \quad [5]$$
$$= 0.458 \text{ (using the values from the example above)}$$

Similarly, the likelihood that the second known person ("Customer", in the example) is the second speaker ("1" in the example) is calculated based on the likelihood that the second speaker is the customer, $Customer_1$, and the likelihood that the first speaker is the agent, $Agent_0$ in the equation [6]:

$$Customer_{score1} = Customer_1 * Agent_0 \quad [6]$$
$$= 0.003 \text{ (using the values from the example above)}$$

These two probabilities may then be again normalized to produce likelihoods that sum to one and indicate the posterior-probability that either speaker is the customer:

$Customer_{weight0}$: normalized probability that the first speaker is the customer $$Customer_{weight0} = Customer_{score0}/(Customer_{score0} + Customer_{score1}) \quad [7]$$
$$= 0.994 \text{ (using the values from the example above)}$$

$Customer_{weight1}$: normalized probability that the second speaker is the customer $$Customer_{weight1} = Customer_{score1}/(Customer_{score0} + Customer_{score1}) \quad [8]$$
$$= 0.006 \text{ (using the values from the example above)}$$

Using the values $Customer_{score0}$ and $Customer_{score1}$, or $Customer_{weight0}$ and $Customer_{weight1}$, it appears that the first speaker may be the customer. By comparing the relative probabilities between the first speaker and second speakers, the probabilities that the second speaker is the customer are much lower. In some embodiments, these values may be evaluated to determine which speaker, if any, is the second known person.

In the example of FIG. 3, however, the speaker identification facility does not determine which speaker is the customer. Instead, the facility determines whether either speaker is the customer. Accordingly, the facility may then use the normalized probabilities calculated in equations [7] and [8] as weights in a weighted sum of the probabilities calculated in equations [5] and [6]. The weighted sum is illustrated in equation [9]:

$$Customer_{score} = (Customer_{score0} * Customer_{weight0}) + (Customer_{score1} * Customer_{weight1})$$
$$= 2.2897 \text{ (using the values from the example above)}$$

This produces a score indicative of whether the second known person (e.g., the customer) is speaking in the conversation. By evaluating this score, such as by comparing it to a threshold, it can be determined whether the second known person is one of the speakers in the conversation. Once the determination is made, the process 300 ends.

As discussed above, in some embodiments the speaker identification facility may perform a speaker identification process (e.g., the process of FIG. 2 and/or FIG. 3) during a conversation, such as at a start of a conversation. In some embodiments, the caller identification process may determine, based on audio for a portion of the conversation, a binary, yes/no result of whether a particular known person is one of the speakers in the conversation. In other embodiments, however, the facility may not produce a simple binary result. FIG. 4 illustrates an example of a process that may be used in some embodiments for evaluating a conversation to determine whether a particular known person is speaking in a conversation.

The process 400 begins in block 402, in which the speaker identification facility generates, based on an analysis of audio for a conversation, a score indicating whether the particular known person is a speaker in the conversation.

In block 404, the facility determines whether the score exceeds a confirmation threshold, which is a threshold for confirming that the particular known person is a speaker in the conversation. If so, then in block 406 the facility outputs a conversation message. Outputting the confirmation message may include displaying a message that the particular known person is a speaker in the conversation, or outputting a message (e.g., via a network) indicating as such. The message may be one that that another facility is configured to, upon receipt, display or otherwise present a message to a user, or otherwise respond to. Once the message is output, the process 400 ends.

If, however, the score does not exceed the confirmation threshold, then in block 408 the facility determines whether it is below a rejection threshold, which is a threshold for disconfirming that the particular known person is a speaker in the conversation. If so, then in block 410 the facility outputs a rejection message. Outputting the rejection message may include displaying a message that the particular known person is not a speaker in the conversation, or outputting a message (e.g., via a network) indicating as such. The message may be one that that another facility is configured to, upon receipt, display or otherwise present a message to a user, or otherwise respond to. Once the message is output, the process 400 ends.

If, however, the score is not below the rejection threshold, then the facility may collect additional audio for the conversation in block 412. The additional audio may be any suitable amount of audio, such as audio for another 5 or 10 seconds of the conversation, or audio for a number of speaker turns (e.g., two or three speaker turns), whether a turn is a clip of speech for one of the speakers in the conversation. Once the additional audio has been collected, then the process 400 returns to block 402, in which the audio for the conversation (including the earlier audio and the new audio) is analyzed in the processing of block 402. For example, the audio may be re-segmented and re-analyzed as described above in connection with FIGS. 2 and 3.

The process 400 may repeat, in some embodiments, until the score exceeds the confirmation threshold or drops below the rejection threshold. In other embodiments, after a certain number of iterations of the process 400, or after a certain amount of time (e.g., 45 seconds, 1 minute, etc.), or after a certain number of speaker turns, or in response to any other condition, the speaker identification facility may determine that the particular known person cannot be identified in the conversation using audio analysis. In response, the speaker identification facility may trigger a process for using challenge questions to determine whether the particular known person is a speaker in the conversation. Or, in embodiments in which the audio of a conversation includes an agent asking challenge questions and a caller answering them and in which the caller's answers to the challenge questions are used in determining whether the caller is the particular known person, the facility may stop using a result of the audio analysis in determining whether the caller is the particular known person and instead use only the answers to the challenge questions.

Techniques operating according to the principles described herein may be implemented in any suitable manner. Included in the discussion above are a series of flow charts showing the steps and acts of various processes that confirm whether a known person is a speaker in a conversation through analysis of audio of the conversation. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 506 of FIG. 5 described below (i.e., as a portion of a computing device 500) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Figure 5:
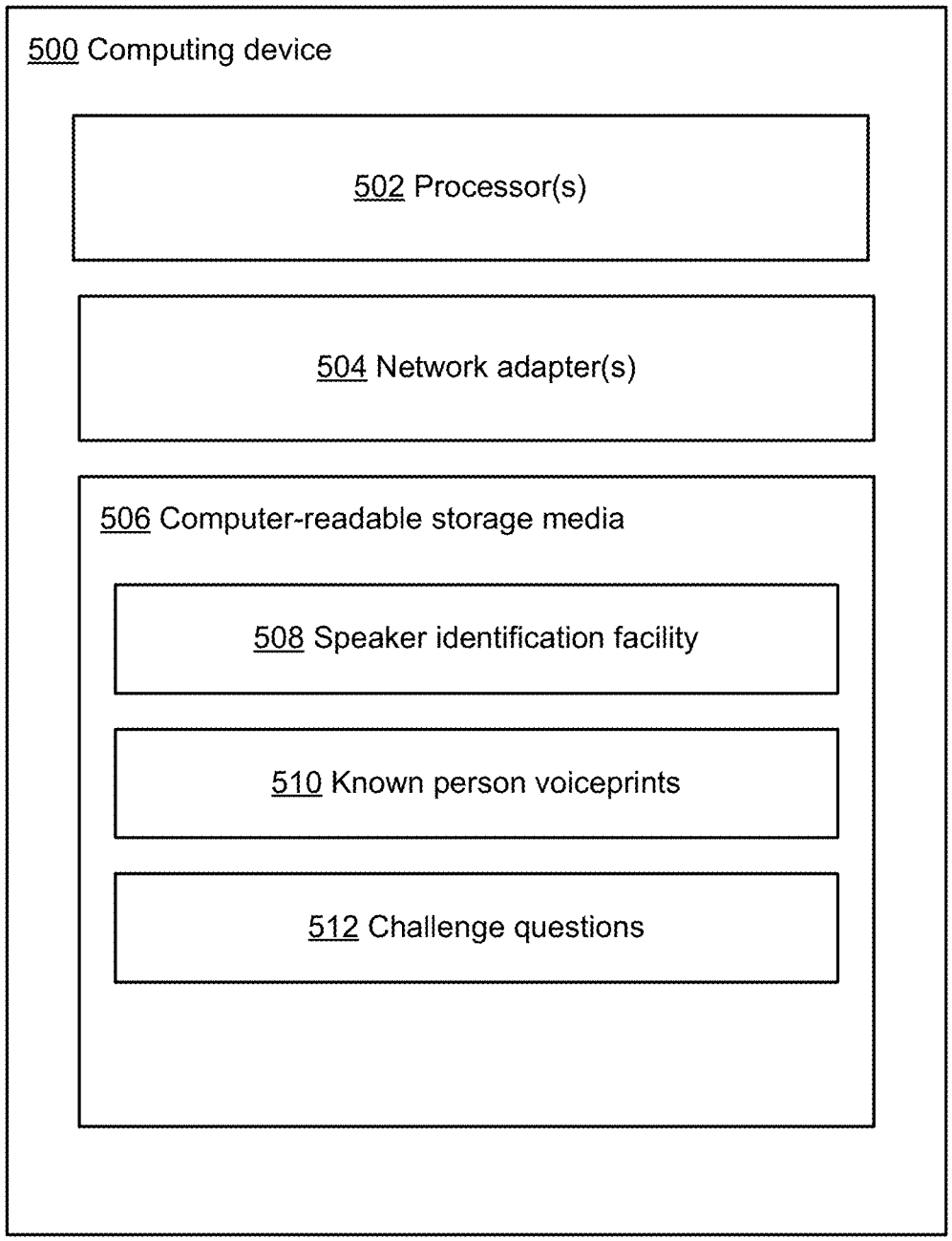
FIG. 5 is a block diagram of an example of a computing device with which some embodiments may operate.

FIG. 5 illustrates one exemplary implementation of a computing device in the form of a computing device 500 that may be used in a system implementing techniques described herein, although others are possible. It should be appreciated that FIG. 5 is intended neither to be a depiction of necessary components for a computing device to operate in accordance with the principles described herein, nor a comprehensive depiction.

Computing device 500 may comprise at least one processor 502, a network adapter 504, and computer-readable storage media 506. Computing device 500 may be, for example, a desktop or laptop personal computer, a personal digital assistant (PDA), a smart mobile phone, a server, or any other suitable computing device. Network adapter 504 may be any suitable hardware and/or software to enable the computing device 500 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 506 may be adapted to store data to be processed and/or instructions to be executed by processor 502. Processor 502 enables processing of data and execution of instructions. The data and instructions may be stored on the computer-readable storage media 506 and may, for example, enable communication between components of the computing device 500.

The data and instructions stored on computer-readable storage media 506 may comprise computer-executable instructions implementing techniques which operate according to the principles described herein. In the example of FIG. 5, computer-readable storage media 506 stores computer-executable instructions implementing various facilities and storing various information as described above. Computer-readable storage media 506 may store a speaker identification facility 508, voiceprints 510 for two or more known persons (including, e.g., one or more agents), and challenge questions 512 that may include, in some embodiments, answers to challenge questions for particular known persons.

While not illustrated in FIG. 5, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method of evaluating whether a first speaker in a conversation is a user whose identity has been asserted by analyzing audio of the conversation, wherein the conversation involves a second speaker whose identity is known, and wherein at least a portion of the audio of the conversation has been decomposed into a first segment and a second segment, each of the first segment and the second segment being composed substantially of audio of a single speaker speaking in the conversation, the method comprising:
    comparing the first segment to a first voiceprint of the user to determine a first likelihood that the first segment corresponds to the user;
    comparing the first segment to a second voiceprint of the second speaker to determine a second likelihood that the first segment corresponds to the second speaker;
    comparing the second segment to the first voiceprint of the user to determine a third likelihood that the second segment corresponds to the user;
    comparing the second segment to the second voiceprint of the second speaker to determine a fourth likelihood that the second segment corresponds to the second speaker; and
    determining whether the first speaker is the user based, at least in part, on the first, second, third and fourth likelihoods.

2. The method of claim 1, further comprising:
    receiving two or more segments of the audio of the conversation as a result of speaker segmentation performed on the audio of the conversation, wherein the first segment of audio comprises audio for a first plurality of turns in the conversation that were identified in the speaker segmentation result as corresponding to the first speaker speaking and the second segment of audio comprises audio for a second plurality of turns in the conversation that were identified in the speaker segmentation result as corresponding to the second speaker speaking.

3. The method of claim 2, wherein:
    the second speaker is a call center agent of a cell center;
    the conversation is at least a portion of a telephone call to the call center, wherein the at least the portion includes both the call center agent and the first speaker speaking;
    the first speaker has claimed in the telephone call to be a first known person; and
    the method further comprises, in response to determining that the first speaker is the user, outputting a message for display to the call center agent that the user has been identified in the conversation.

4. The method of claim 3, further comprising:
    selecting the first voiceprint for the user from a set of voiceprints in response to a claim by the first speaker to be the user; and
    selecting the second voiceprint for the call center agent from the set of voiceprints in response to determining that the telephone call center agent is handling the call.

5. The method of claim 1, wherein comparing the first segment to the first voiceprint of the user to determine the first likelihood that the first segment corresponds to the user comprises calculating the first likelihood based at least in part on a likelihood that the first segment is a correct match to the first segment and a likelihood that the first segment is not a correct match to the first segment.

6. The method of claim 1, wherein comparing the first segment to the first voiceprint of the user to determine the first likelihood that the first segment corresponds to the user comprises:
generating a first degree of match between the first voiceprint of the user and the first segment; and
calculating the first likelihood based at least in part on the first degree of match and a distribution of degrees of match between segments of speech of speakers and voiceprints for those speakers.

7. The method of claim 6, wherein calculating the first likelihood comprises calculating the first likelihood based at least in part on the first degree of match and a second distribution of degrees of match between segments of speech of speakers and voiceprints for different speakers.

8. The method of claim 6, wherein:
comparing the first segment to the second voiceprint of the second speaker to determine the second likelihood that the first segment corresponds to the second speaker comprises:
generating a second degree of match between the second voiceprint of the second speaker and the first segment, and
calculating the second likelihood based on the second degree of match and the distribution of degrees of match between segments of speech of speakers and voiceprints for those speakers;
comparing the second segment to the first voiceprint of the user to determine the third likelihood that the second segment corresponds to the user comprises:
generating a third degree of match between the first voiceprint of the user and the second segment, and
calculating the third likelihood based on the third degree of match and the distribution of degrees of match between segments of speech of speakers and voiceprints for those speakers; and
comparing the second segment to the second voiceprint of the second speaker to determine the fourth likelihood that the second segment corresponds to the second speaker comprises:
generating a fourth degree of match between the second voiceprint of the second speaker and the second segment, and
calculating the fourth likelihood based on the fourth degree of match and the distribution of degrees of match between segments of speech of speakers and voiceprints for those speakers.

9. The method of claim 8, wherein:
calculating the first likelihood comprises calculating the first likelihood based at least in part on the first degree of match and a second distribution of degrees of match between segments of speech of speakers and voiceprints for different speakers;
calculating the second likelihood comprises calculating the second likelihood based at least in part on the second degree of match and the second distribution of degrees of match between segments of speech of speakers and voiceprints for different speakers;
calculating the third likelihood comprises calculating the third likelihood based at least in part on the third degree of match and the second distribution of degrees of match between segments of speech of speakers and voiceprints for different speakers;
calculating the fourth likelihood comprises calculating the fourth likelihood based at least in part on the fourth degree of match and the second distribution of degrees of match between segments of speech of speakers and voiceprints for different speakers.

10. The method of claim 9, wherein calculating the first likelihood based at least in part on the first degree of match, the distribution of degrees of match between segments of speech of speakers and voiceprints for those speakers, and the second distribution of degrees of match between segments of speech of speakers and voiceprints for different speakers comprises:
calculating a first non-normalized likelihood that the first segment corresponds to the user based on the first degree of match and the first distribution of degrees of match between segments of speech of speakers and voiceprints for those speakers;
calculating a second non-normalized likelihood that the first segment does not correspond to the user based on the first degree of match and the second distribution of degrees of match between segments of speech of speakers and voiceprints for different speakers; and
calculating the first likelihood as a normalized likelihood based on the first non-normalized likelihood and the second non-normalized likelihood.

11. The method of claim 10, wherein determining whether the first speaker is the user based, at least in part, on the first, second, third and fourth likelihoods comprises:
generating a fifth likelihood that the first segment matches the first voiceprint of the user by calculating a first combined likelihood of the first segment matching the first voiceprint and of the second segment matching the second voiceprint, wherein calculating the first combined likelihood comprises performing at least one calculation including the first likelihood and the second likelihood;
generating a sixth likelihood that the second segment matches the first voiceprint of the user by calculating a second combined likelihood of the second segment matching the first voiceprint and of the first segment matching the second voiceprint, wherein calculating the second combined likelihood comprises performing at least one calculation including the third likelihood and the fourth likelihood; and
calculating an overall likelihood indicative of whether the user is speaking in the conversation comprises calculating the overall likelihood based at least in part on the fifth likelihood that the first segment matches the first voiceprint of the user and the sixth likelihood that the second segment matches the first voiceprint of the user.

12. At least one non-transitory computer-readable storage medium having encoded thereon executable instructions that, when executed by at least one processor, cause the at least one processor to carry out a method for determining whether a first known person is speaking in a conversation involving two or more speakers, wherein one of the two or more speakers is known to be a second known person, the method comprising:
comparing each segment of two or more segments of audio of the conversation to at least two voiceprints, wherein the at least two voiceprints comprise a first voiceprint for the first known person and a second voiceprint for the second known person, wherein the two or more segments of the audio comprise a first segment of audio for a first speaker in the conversation and a second segment of audio for a second speaker in the conversation, and wherein the first segment of audio for the first speaker comprises audio of the conversation that has been identified as corresponding to the first speaker speaking in the conversation and the second segment of audio for the second speaker comprises audio of the conversation that has been identified as corresponding to the second speaker speaking in the conversation; and determining, based at least in part on a result of the comparing, whether any one of the two or more speakers is the first known person.

13. The at least one computer-readable storage medium of claim 12, wherein:
the result of the comparing indicates at least a first likelihood that the first segment of audio for the first speaker comprises audio of the first known person speaking and a second likelihood that the second segment of audio for the second speaker comprises audio of the first known person speaking; and
determining, based at least in part on the result of the comparing, whether one of the two or more speakers is the first known person comprises determining based at least in part on both the first likelihood and the second likelihood.

14. The at least one computer-readable storage medium of claim 13, wherein:
comparing each segment of the two or more segments of audio of the conversation to the at least two voiceprints comprises calculating the first likelihood and the second likelihood;
calculating the first likelihood that the first segment of audio for the first speaker comprises audio of the first known person speaking comprises calculating the first likelihood based at least in part on a third likelihood that the second segment of audio for the second speaker comprises audio of the second known person speaking; and
calculating the second likelihood that the second segment of audio for the second speaker comprises audio of the first known person speaking comprises calculating the second likelihood based at least in part on a fourth likelihood that the first segment of audio for the first speaker comprises audio of the second known person speaking.

15. The at least one computer-readable storage medium of claim 12, wherein:
the result of the comparing indicates at least a first likelihood that the first segment of audio for the first speaker comprises audio of the first known person speaking and a second likelihood that the second segment of audio for the second speaker comprises audio of the second known person speaking; and
determining, based at least in part on the result of the comparing, whether one of the two or more speakers is the first known person comprises determining based at least in part on both the first likelihood and the second likelihood.

16. The at least one computer-readable storage medium of claim 12, wherein comparing each segment of the two or more segments of audio of the conversation to the at least two voiceprints comprises calculating a first joint likelihood that the first segment of audio for the first speaker comprises audio of the first known person speaking and that the second segment of audio for the second speaker comprises audio of the second known person speaking, wherein calculating the first joint likelihood comprises calculating the first joint likelihood based at least in part on a first likelihood that the first segment of audio for the first speaker includes audio of the first known person speaking and on a second likelihood that the second segment of audio for the second speaker includes audio of the second known person speaking.

17. The at least one computer-readable storage medium of claim 16, wherein:
comparing each segment of two or more segments of audio of the conversation to at least two voiceprints comprises calculating a second joint likelihood that the second segment of audio for the second speaker comprises audio of the first known person speaking and that the first segment of audio for the first speaker comprises audio of the second known person speaking, wherein calculating the second joint likelihood comprises calculating the second joint likelihood based at least in part on a third likelihood that the second segment of audio for the second speaker includes audio of the first known person speaking and on a fourth likelihood that the first segment of audio for the first speaker includes audio of the second known person speaking; and
determining, based at least in part on a result of the comparing, whether to identify the first speaker as the first known person comprises determining based at least in part on the first joint likelihood and the second joint likelihood.

18. The at least one computer-readable storage medium of claim 12, wherein comparing each segment of two or more segments of audio of the conversation to at least two voiceprints comprises:
generating, for each pair of a segment and a voiceprint, a score indicating a degree of match between the voiceprint of the pair and speech included in the segment of the pair; and
calculating an overall score indicative of a likelihood that any one of the two or more speakers is the first known person based at least in part on the scores for each pair of a segment and a voiceprint.

19. The at least one computer-readable storage medium of claim 18, wherein comparing each segment of two or more segments of audio of the conversation to at least two voiceprints further comprises:
generating, for each pair of a segment and a voiceprint, a first likelihood that the voiceprint is a correct match for the segment and a second likelihood that the voiceprint is not a correct match for the segment, wherein generating the first and second likelihood for each pair of a segment and a voiceprint comprises comparing the score for the pair that indicates the degree of match to both of a first distribution of degrees of match between segments of speech of speakers and voiceprints for those speakers and a second distribution of degrees of match between segments of speech for speakers and voiceprints for different speakers.

20. An apparatus comprising:
at least one processor; and
at least one storage medium having encoded thereon executable instructions that, when executed by the at least one processor, cause the at least one processor to carry out a method of evaluating whether a first speaker in a conversation is a user whose identity has been asserted by analyzing audio of the conversation, wherein the conversation involves a second speaker whose identity is known, and wherein at least a portion of the audio of the conversation has been decomposed into a first segment and a second segment, each of the first segment and the second segment being composed substantially of audio of a single speaker speaking in the conversation, the method comprising:

comparing the first segment to a first voiceprint of the user to determine a first likelihood that the first segment corresponds to the first speaker;

comparing the first segment to a second voiceprint of the second speaker to determine a second likelihood that the first segment corresponds to the second speaker;

comparing the second segment to the first voiceprint of the user to determine a third likelihood that the second segment corresponds to the first speaker;

comparing the second segment to the second voiceprint of the second speaker to determine a fourth likelihood that the second segment corresponds to the second speaker; and determining whether the first speaker is the user based, at least in part, on the first, second, third and fourth likelihoods.

* * * * *